(12) United States Patent
Bellander et al.

(10) Patent No.: US 10,823,643 B2
(45) Date of Patent: Nov. 3, 2020

(54) METHOD AND DEVICE FOR HANDLING DYNAMIC CHARACTERISTICS OF A VIBRATING MACHINE COMPONENT

(71) Applicant: Aktiebolaget SKF, Gothenburg (SE)

(72) Inventors: Magnus Bellander, Boden (SE); Per-Erik Larsson, Lulea (SE)

(73) Assignee: Aktiebolaget SKF, Gothenburg (SE)

( * ) Notice: Subject to any disclaimer, the term of this patent is extended or adjusted under 35 U.S.C. 154(b) by 363 days.

(21) Appl. No.: 15/332,134

(22) Filed: Oct. 24, 2016

(65) Prior Publication Data

US 2017/0131184 A1    May 11, 2017

(30) Foreign Application Priority Data

Nov. 6, 2015 (SE) ...................................... 1551436

(51) Int. Cl.
| | |
|---|---|
| *G01M 99/00* | (2011.01) |
| *F16F 15/00* | (2006.01) |
| *G01M 13/045* | (2019.01) |
| *G01M 7/00* | (2006.01) |
| *G01M 13/00* | (2019.01) |
| *G05D 19/02* | (2006.01) |

(52) U.S. Cl.
CPC ......... *G01M 99/008* (2013.01); *F16F 15/002* (2013.01); *G01M 7/00* (2013.01); *G01M 13/00* (2013.01); *G01M 13/045* (2013.01); *G05D 19/02* (2013.01)

(58) Field of Classification Search
CPC .. G01M 99/008; G01M 13/045; G05D 19/02; F16F 15/002; F03D 7/0276; F03D 7/0296; F03D 7/042; F03D 7/0224; F03D 7/043; F03D 9/25; F05B 2270/0333; Y02E 10/722; Y02E 10/723; Y02E 10/725
USPC ......... 290/44; 700/287; 73/660; 702/34, 181
See application file for complete search history.

(56) References Cited

U.S. PATENT DOCUMENTS

| | | | |
|---|---|---|---|
| 2005/0155429 A1 | 7/2005 | Griessler et al. | |
| 2010/0332272 A1* | 12/2010 | Ong ...................... | G06Q 10/20 705/7.36 |
| 2011/0158806 A1* | 6/2011 | Arms ...................... | F03D 7/043 416/31 |
| 2012/0070233 A1* | 3/2012 | Wang ...................... | E02D 27/42 405/232 |

(Continued)

FOREIGN PATENT DOCUMENTS

| | | |
|---|---|---|
| CN | 101289990 A | 10/2008 |
| EP | 2921829 A1 | 9/2015 |

*Primary Examiner* — Mouloucoulaye Inoussa
(74) *Attorney, Agent, or Firm* — Garcia-Zamor Intellectual Property Law; Ruy Garcia-Zamor; Bryan Peckjian (57) ABSTRACT

The embodiments herein relate to a method performed by an analyzing device for handling dynamic characteristics of a vibrating machine component. The analyzing device monitors vibration of the machine component in real-time. When the vibration of the machine component is below and close to a threshold, the analyzing device provides a real-time indication of that the vibration of the machine component is below and close to the threshold. The analyzing device obtains the dynamic characteristics of the machine component when the vibration is below and close to the threshold. A change of the dynamic characteristics influences how close the vibration is to the threshold.

13 Claims, 7 Drawing Sheets

(56) References Cited

U.S. PATENT DOCUMENTS

| | | | |
|---|---|---|---|
| 2012/0209539 A1* | 8/2012 | Kim | F03D 17/00 702/41 |
| 2013/0035798 A1* | 2/2013 | Zhou | G06Q 10/06 700/287 |
| 2014/0046881 A1* | 2/2014 | Losl | G05B 23/0245 706/14 |
| 2014/0327243 A1* | 11/2014 | Demtroder | F03D 7/0276 290/44 |
| 2015/0292937 A1 | 10/2015 | Chernega et al. | |
| 2016/0341180 A1* | 11/2016 | Lee | F03D 7/0224 |

* cited by examiner

METHOD AND DEVICE FOR HANDLING DYNAMIC CHARACTERISTICS OF A VIBRATING MACHINE COMPONENT

CROSS REFERENCE TO RELATED APPLICATIONS

This application claims priority to Swedish patent application no. 1551436-7 filed on 11 Jun. 2015, the contents of which are fully incorporated herein by reference.

FIELD OF THE INVENTION

Embodiments herein relate generally to an analyzing device, a method performed by the analyzing device, a system and a method performed by the system. More particularly the embodiments herein relate to handling dynamic characteristics of a vibrating machine component.

BACKGROUND OF THE INVENTION

Machine components are subject to wear and damages while in operation. The wear and damages may be caused by a variety of parameters, for example vibrations, overload etc. In many cases, vibration is undesirable—wasting energy and creating unwanted sound. For example, the vibrational motions of machines, engines, electric motors, or any mechanical device in operation are typically unwanted. Such vibrations can be caused by imbalances in the rotating parts, uneven friction, weight, moisture, tension, the meshing of gear teeth, etc. of the machine components.

Vibration sensors may be used in order to detect and monitor vibrations which machine components are subject to while they are operating. When the maintenance personnel analyze the data from the vibration sensors, they may detect a machine component failure. The vibration data from the vibration sensor is typically visualized to the maintenance personnel as a graph for each machine component in a machine, where for example high peaks may indicate a machine component failure which has already occurred. Based on the analysis of the vibration data, the maintenance personnel can plan and schedule future maintenance of the machine which provides the machine component which has failed.

When a machine component has failed, the whole machine may need to be stopped in order for the maintenance personnel to repair or replace the failed component. Shutting down the machine, performing the repair or replace and starting up the machine can take a large amount of time.

BRIEF SUMMARY OF THE INVENTION

An objective of the embodiments disclosed herein is therefore to obviate at least one of the above disadvantages and to provide improved handling of vibrating machine components.

According to a first aspect, the object is achieved by a method performed by an analyzing device for handling dynamic characteristics of a vibrating machine component. The analyzing device monitors vibration of the machine component in real-time. When the dynamic characteristics of the machine component are below and close to a threshold, the analyzing device provides a real-time indication of that the vibration of the machine component is close to the threshold. The analyzing device obtains the dynamic characteristics of the machine component based on vibration data which is below and close to the threshold. A change of the dynamic characteristics influences how close the vibration is to the threshold.

According to a second aspect, the object is achieved by an analyzing device for handling dynamic characteristics of a vibrating machine component. The analyzing device is adapted to monitor vibration of the machine component in real-time. The analyzing device is further adapted to, when the vibration of the machine component is below and close to a threshold, provide a real-time indication of that the vibration of the machine component is below and close to the threshold. The analyzing device is adapted to obtain the dynamic characteristics of the machine component based on that the vibration is below and close to the threshold. A change of the dynamic characteristics influences how close the vibration is to the threshold.

According to a third aspect, the object is achieved by a method performed by a system for handling dynamic characteristics of a vibrating machine component. A vibration sensor senses vibration of the machine component in real-time. The vibration sensor provides vibration data from the vibration sensor to an analyzing device. The analyzing device monitors the vibration of the machine component in real-time based on the vibration data from the vibration sensor. When the dynamic characteristics of the machine component are below and close to a threshold, the analyzing device provides a real-time indication of that the vibration of the machine component is close to the threshold. The analyzing device obtains the dynamic characteristics of the machine component based on that the vibration is below and close to the threshold. A change of the dynamic characteristics influences how close the vibration is to the threshold.

According to a fourth aspect, the object is achieved by a system for handling dynamic characteristics of a vibrating machine component. A vibration sensor is adapted to sense vibration of the machine component in real-time. The vibration sensor is further adapted to provide vibration data from the vibration sensor to an analyzing device. The analyzing device is adapted to monitor the vibration of the machine component in real-time based on the vibration data from the vibration sensor. The analyzing device is adapted to, when the dynamic characteristics of the machine component is below and close to a threshold, provide a real-time indication of that the vibration of the machine component is close to the threshold. The analyzing device is adapted to obtain the dynamic characteristics of the machine component based on that the vibration is below and close to the threshold. A change of the dynamic characteristics influences how close the vibration is to the threshold.

Since a real-time indication of that the vibration of the machine component is below and close the threshold is provided, it is possible to detect and take care of the machine components in real-time and before a failure occurs, i.e. the handling of the machine component is improved.

Embodiments herein afford many advantages, of which a non-exhaustive list of examples follows:

Since the indication indicates that the machine component has dynamic characteristics which are close to the threshold, an unfavorable state of the machine component is detected before a failure occurs. With this, the embodiments herein have an advantage of that the unfavorable state can be controlled before a failure occurs, i.e. a machine component failure is avoided.

Since a machine component failure may be avoided, another advantage of the embodiments herein is that the life time of the machine component may be prolonged.

Another advantage of the embodiments herein may be that a machine which provides the machine component can increase its production because an unfavorable state of the machine component can be detected and controlled before a failure occurs, i.e. the machine does not have to be stopped in order to replace any failed components.

The embodiments herein are not limited to the features and advantages mentioned above. A person skilled in the art will recognize additional features and advantages upon reading the following detailed description.

BRIEF DESCRIPTION OF THE SEVERAL VIEWS OF THE DRAWING

The embodiments herein will now be further described in more detail in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION OF THE INVENTION

Figure 1:
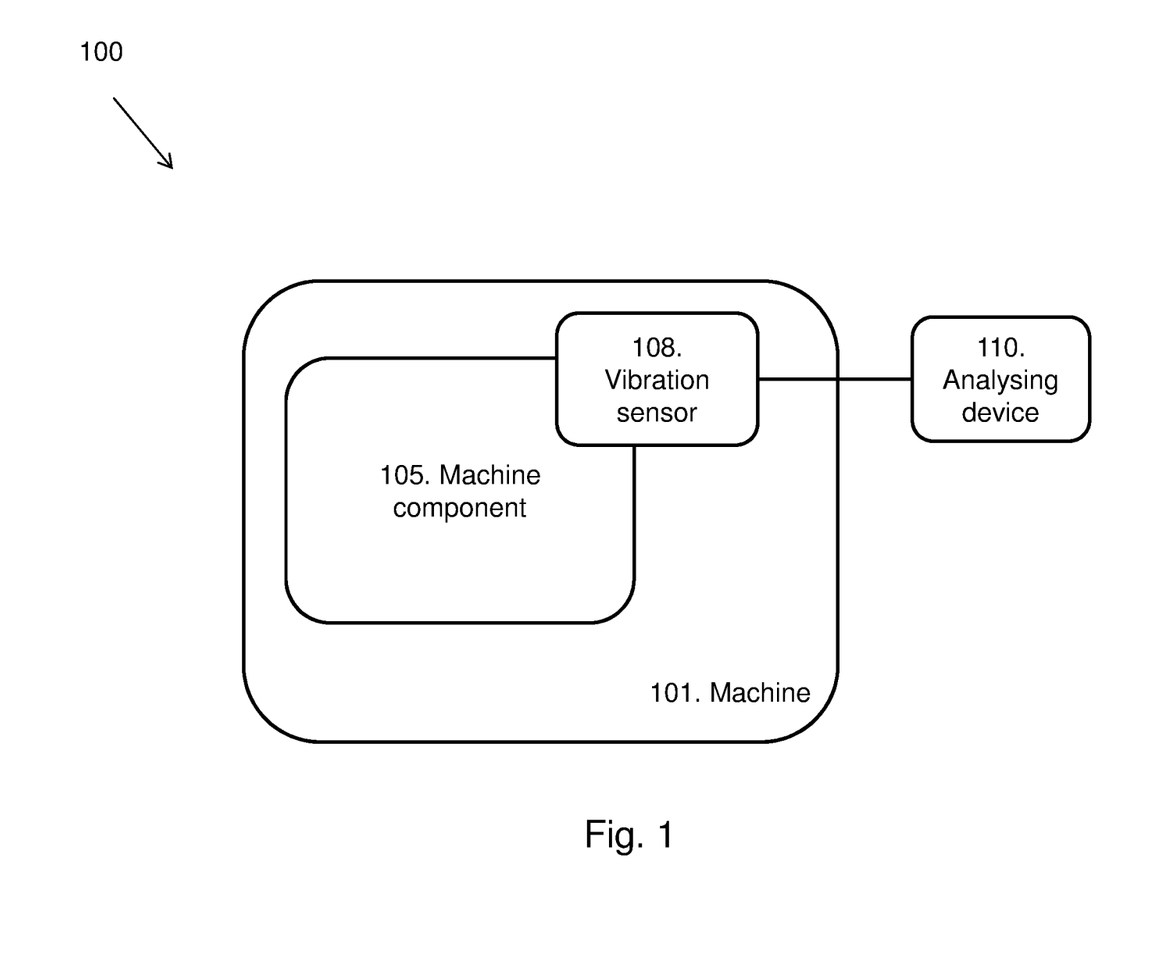
FIG. 1 is a schematic block diagram illustrating a system.

FIG. 1 is a schematic block diagram illustrating a system 100 comprising a machine 101. The machine 101 provides at least one machine component 105. The machine 101 may be for example a conveyor, a water turbine, a wind turbine, a mill etc. The machine 101 may be adapted to be used in the pulp and paper industry, the oil and gas industry, power generation, metal working, mining, food and beverage industry etc. In an example where the machine 101 is a conveyor, the machine component 105 may be for example a drum or a roller. In an example where the machine 101 is a hydro turbine, the machine component 105 may be for example a bearing or a coupling. The terms element, part and member may be used interchangeably with the term component herein. A machine 101 may provide one or a plurality of machine components 105. In the embodiments herein, a machine component 105 is any stationary, rotating, oscillating or linear component where a resonance may be excited during operation.

A vibration sensor 108 is associated with the machine component 105, e.g. it may be directly connected to the machine component 105, it may be connected to the machine component 105 in a certain distance from the machine component 105, it may be connected to more than one machine component 105 etc. The vibration sensor 108 may be described as a device which is adapted to sense vibrations in the machine component 105 in real-time when it is in operation, i.e. when the machine component 105 is moving. Vibrations may be described as for example oscillations which occur in relation to an equilibrium point in the machine component 105. The vibration sensor 108 may be adapted to sense periodic vibrations, random vibrations or both periodic and random vibrations in the machine component 105. The vibration sensor 108 may be for example an accelerometer which measures vibration in m/s2, a velocity sensor which measures vibration in m/s or mm/s, speed sensor, position sensor etc.

An analyzing device 110 is adapted to communicate with the vibration sensor 108 in real-time. The analyzing device 110 may be for example a stationary computer, a handheld computer, a mobile phone, a tablet computer etc. The analyzing device 110 is adapted to processes and possibly also display information associated with vibration data obtained by the vibration sensor 108. The analyzing device 110 may be a Continuous Monitoring (CoMo) device or system It should be noted that the communication links between the units provided in the system 100 may be of any suitable kind including either a wired or wireless link. The links may use any suitable protocol depending on type and level of layer (e.g. as indicated by the Open Systems Interconnection (OSI) model) as understood by the person skilled in the art.

The method for handling dynamic characteristics of a machine component 105 in motion, according to some embodiments will now be described with reference to the signaling diagram in FIG. 2.

Figure 2:
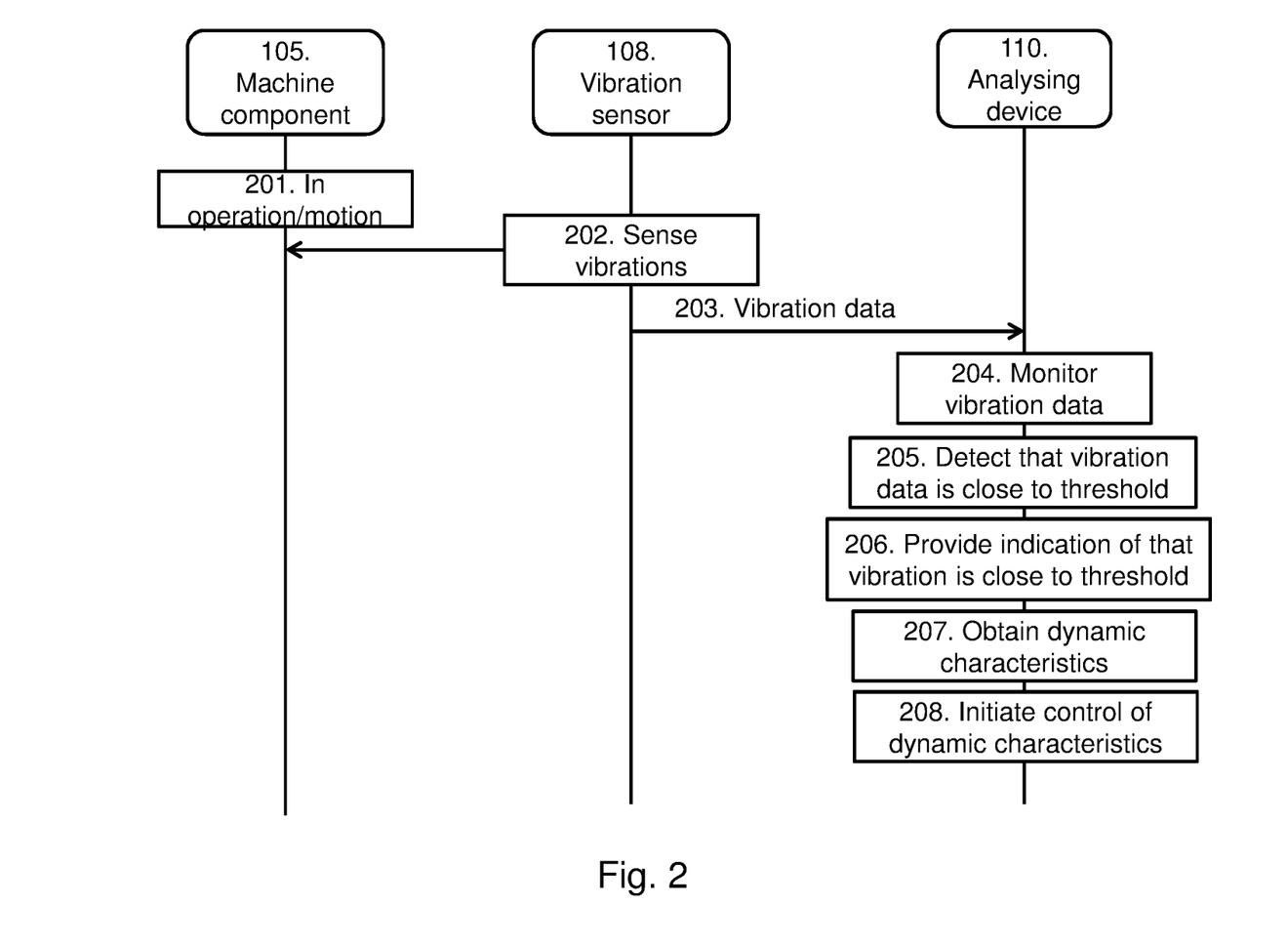
FIG. 2 is a signaling diagram illustrating embodiments of a method.

The method in FIG. 2 provides at least some of the following steps, which steps may as well be carried out in another suitable order than described below:

Step 201

The machine 101 and the machine component 105 are in operating state. When the machine component 105 is in operating state, it may be moving e.g. in a linear manner, a rotating manner or both in a linear and rotating manner.

Step 202

The vibration sensor 108 senses vibrations in the machine component 105 in real-time. The sensing may be performed continuously at least when the machine component 105 is in operating state. The vibration sensing may be performed in radial direction, an axial direction or in both radial and axial direction. The vibration sensor 108 may be positioned close to the object to be monitored, e.g. the machine component 105. For example, a bearing housing with a vibration sensor 108 which is either positioned axially or radially with respect to the movement of the machine component 105.

Step 203

The vibration sensor 108 provides information indicating the real-time vibration data to the analyzing device 110. The information may be provided by continuously transmitting the data to the analyzing device 110. The information may be the actual real-time vibration data, or it may be information about where the vibration data can be found, for example when the vibration data is stored in an external memory device. The analyzing device 110 obtains the real-time vibration data from the vibration sensor 108. The term real-time vibration data refers to that the vibration data is transmitted to the analyzing device 110 at the same time as the vibration is sensed by the vibration sensor 108.

Step 204

The analyzing device 110 receives the real-time vibration data from step 203 and monitors the vibration data. The monitoring is performed in real-time and on real-time vibration data, i.e. the monitoring is not performed e.g. several hours after or the day after the vibration has been sensed by the vibration sensor 108.

Step 205

When the analyzing device 110 monitors the vibration data in real-time, it may detect that the vibration data is getting close to a threshold or that the vibration data is far away from the threshold, i.e. in an acceptable distance from the threshold. The threshold is associated with the amount of vibration which will cause a machine component failure. This means that, if the vibration has reached or is above the threshold, there has been a machine component failure. When the vibration is getting close to the threshold, it may indicate that the machine component 105 is run in an unfavorable state, i.e. there has not been any machine component failure yet, but running the machine component 105 in a long term unfavorable state without any countermeasures may lead to such failure. For example, a vibration of 10 mm/s in a drum in a conveyor may be the threshold. When the vibration is getting close to the 10 mm/s threshold, i.e. it is between 7 and 8 mm/s, the machine component 105 is run in an unfavorable state and an action needs to be performed to avoid failure.

Figure 3A:
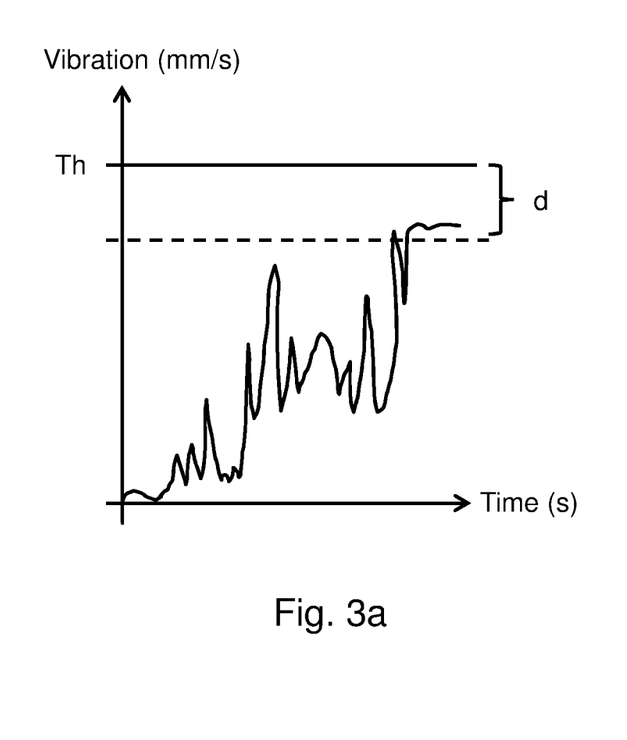
FIG. 3a-3b are examples of the real-time monitored vibration data.
Figure 3B:
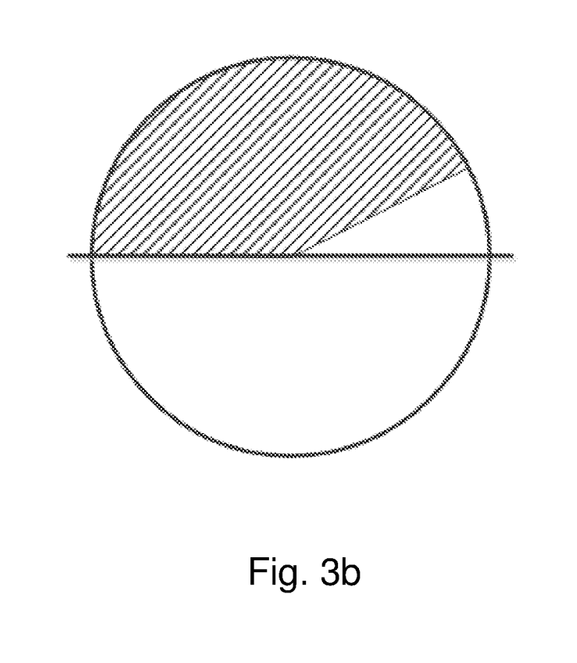

Some examples of representations of the vibration data are seen in FIGS. 3a and 3b. In FIG. 3a, the x-axis represents the time measured in seconds and the y-axis represents the monitored vibration measured in mm/s. The continuous horizontal line represents the threshold (Th) where a machine component failure has occurred when the vibration has reached or is above the threshold. The distance (d) illustrated as the distance between the dotted line and the horizontal threshold line represents when the vibration is close to the threshold. FIG. 3b illustrates another example of the monitored vibration data where the vibration is represented by the shaded part of the circle. When the shaded part of the circle is close to filling half of the circle, the vibration is close to the threshold and the machine component 105 is running in an unfavorable state. When the shaded part of the circle fills half or more of the circle, there is a machine component failure.

Step 206

When the analyzing device 110 has detected that the vibration is currently close to the threshold, the analyzing device 110 provides an indication of that the vibration is close. The vibration is close to the threshold when it is within a certain distance from the threshold, for example as indicated with d in FIG. 3. When the vibration is close to the threshold, it is an indication of that the machine component 105 is run in an unfavorable state.

The indication may be provided as an alarm signal visible or audible to the maintenance personnel. Based on the indication, the maintenance personnel are able to determine if and what action should be taken in order to remove the machine component 105 from the unfavorable state. The indication may also be provided as a trigger signal to a part of the analyzing device 110 which obtains dynamic characteristics in step 207.

Step 207

The analyzing device 110 obtains dynamic characteristics of the machine component 105 based on the vibration data, the machine 101 and component design as well as the machine operating conditions, e.g. when the vibration data which is below and close to the threshold. This may also be described as translating the vibration data into dynamic characteristics. A change of the dynamic characteristics may influences how close the vibration is to the threshold. The dynamic characteristics may also be referred to as dynamic stress.

The dynamic characteristics may also be obtained when the vibration data is below and far away from the threshold (i.e. the vibration is not close to the threshold) and when the vibration is at and above the threshold. The dynamic characteristics for these scenarios may be used for a continuous control of the load (low load represents a long life time and a high load represents a reduced life time of the machine component 105)

The term dynamic characteristics may be used when referring to any of the causes of the vibration of the machine component 105. Therefore, the monitoring of vibration in a machine component 105 may be an indication of that the component 105 and possibly also the complete machine 101 is in an unfavorable state.

The dynamic characteristics may be obtained by performing e.g. a modal analysis of the machine component 105 and possibly also the complete machine 101. It is also possible to perform a validation of this modal analysis for all machine components 105 in the machine 101 using e.g. a Finite Element Method (FEM) to ensure that the result of the modal analysis is valid. The outcome of FEM provides a calculation model for determining the dynamic characteristics for each machine component 105 based on the vibration data. With the calculation model, the monitored real-time vibration data can be translated into dynamic characteristics for each machine component 105 in a machine 101. Any other suitable calculation method may be used instead of the above described modal analysis and FEM.

A modal analysis is a vibration analysis where the vibrations are expressed by their natural frequencies and mode of vibration. Modal analysis is an effective method for analyzing and interpretation of e.g. vibration data from the vibration sensor 108.

FEM can be described as a technique which can be used for verifying that premises and conclusion of analysis are valid. In general, FEM provides methods for connecting several simple element equations over a plurality of subdomains, named finite elements (one finite element may be represented by a machine component 105), to approximate a more complex equation over a large domain (the largest domain may be represented by the whole machine 101).

The dynamic characteristics may be referred to as process parameters and may be for example moisture, tension, number of revolutions etc. of the machine component 105. Which of these examples that are obtained is dependent on which type of machine component 105. For example, if the machine component 105 is a wheel in a conveyor system, one of the dynamic characteristics may be the number of revolutions.

The dynamic characteristics may, in some embodiments, be obtained by reception from a dedicated and standalone device which is dedicated to translating the vibration data into dynamic characteristics.

Figure 4:
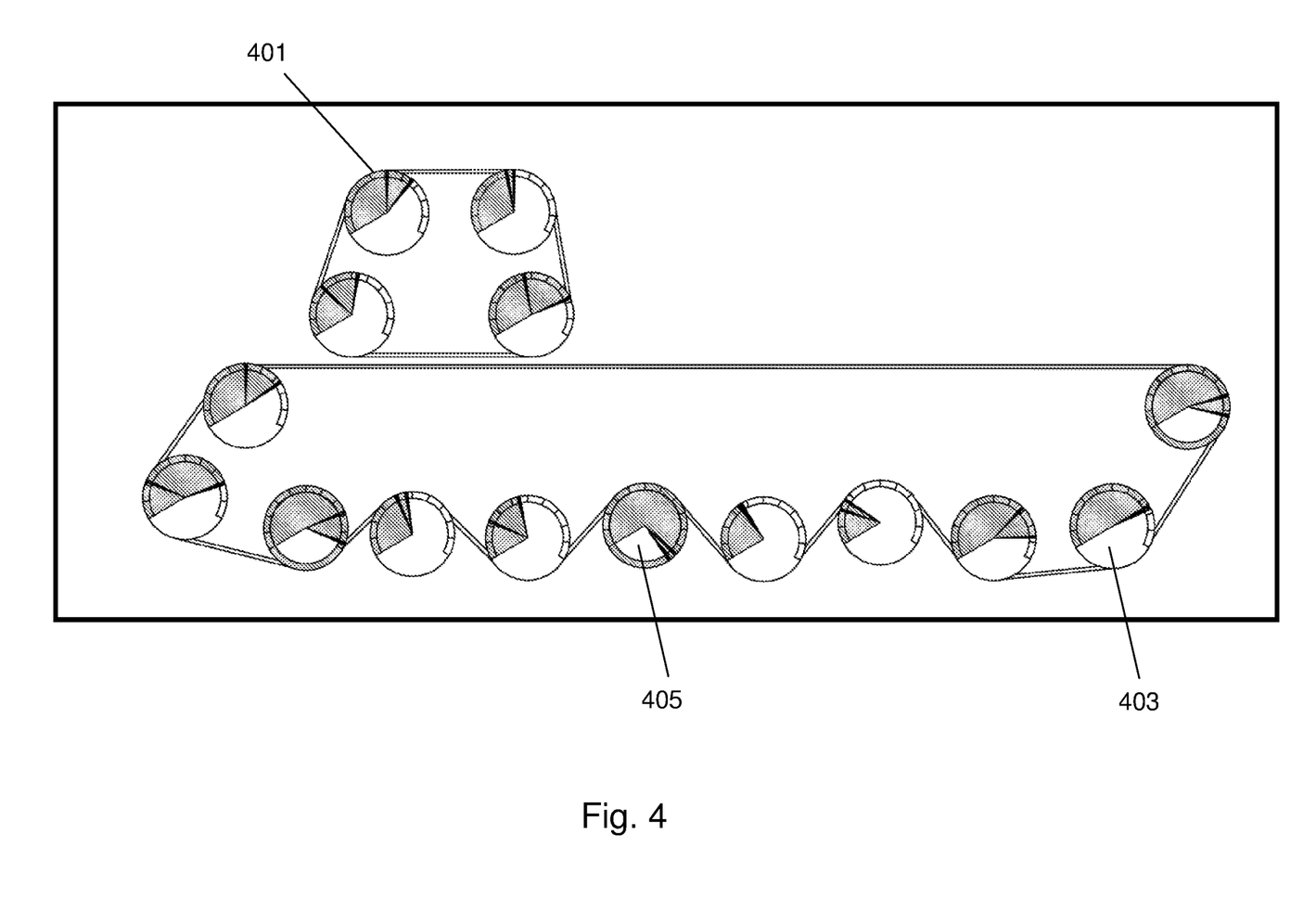
FIG. 4 is a schematic view of an example of a wire section of a paper machine.

When the dynamic characteristics are obtained, they may be for example visible in real-time for the maintenance personnel on a display (e.g. as illustrated in FIG. 4 which will be described in more detail later) or they may be used within the analyzing device 110 in order to initiate control of the dynamic characteristics in step 208 below.

With knowledge of the dynamic characteristics of the machine component 105 it may be possible to determine the amount of load which the machine component 105 is exposed to, and possibly also the machine 101 in order to detect, indicate and initiate reduction of the overload. The load may be determined using the calculation model from the FEM, as described above.

The dynamic characteristics may also be used to determine the life time of the machine 105 and possibly also the machine 101. For example, when the amount of load which the machine component 105 is exposed to has been determined, this amount of load can be used for determining the life time. The life time may be represented by the number of operating hours or revolutions of the machine component 105 when subject to a particular load.

The life time may be determined using any suitable calculation method. For example, if the machine component 105 is a bearing, the life time may be determined using the following equation:

$$L_{10} = \left(\frac{C}{P}\right)^p$$

Where $L_{10}$ represents the basic rating life (at 90% reliability) measured in millions of revolutions. The basic rating life $L_{10}$ for a specific bearing is based on the basic dynamic load rating according to International Organization for Standardization (ISO) 281. C represents a basic dynamic load rating measured in kilo Newton (kN), P represents an equivalent dynamic bearing load measured in Newton (N) and p represents an exponent for the life equation (e.g. 3 for ball bearings, 10/3 for roller bearings etc.).

Step 208

Based on the indication of that the vibration is close to the threshold, the analyzing device 110 may initiate control of the dynamic characteristics which were obtained in step 207. The control may be initiated in different ways, for example that the analyzing device 110 or that the maintenance personnel determines and performs the control of the dynamic characteristics. The control may be preferably initiated immediately after the indication has been provided or at least with the shortest possible delay after the indication has been provided. It is an advantage control of the dynamic characteristic is performed as soon as possible in order to avoid that the vibration of the machine component 105 reaches or exceeds the threshold, i.e. a machine component failure occurs.

For example, when the maintenance personnel have access to the dynamic characteristics, they can determine which of the characteristics and how much they should be controlled in order to remove the machine component 105 from the unfavorable state. In another example, the dynamic characteristics may be used by the analyzing device 110 itself to determine which of the characteristics that should be controlled and in which way they should be controlled. The analyzing device 110 or the maintenance personnel may perform the actual control of the dynamic characteristics. As a result of the control of the dynamic characteristics, the machine component 105 may no longer run or operate in the unfavorable state, and there is no imminent risk for machine component failure.

With the vibration indication and the dynamic characteristics, it may be also possible to detect the start of a failure of a machine component 105.

FIG. 4 illustrates an example where the machine 101 is a wire section of a paper machine. In detail, FIG. 4 illustrates the provided indications of vibration of all of the paper machine components 105 were the vibration is monitored. The example in FIG. 4 may be seen as for example a screen shot of what is visible for the maintenance personnel on a display. For each machine component 105 (e.g. a wheel or a cylinder), an indication of the real-time monitored vibration is provided. In the example illustrated in FIG. 4, the indication is provided as a circular diagram for each machine component 105. Each circular diagram may be divided into ten (10) sections. The shaded area represents the monitored vibration. When the shaded area covers all sections, it is an indication of that a machine component failure has occurred. In other words, the threshold for the machine component failure is when all sections are covered by the shaded area. For example, in the circular diagram with reference number 401, the shaded area indicates that that the vibration covers approximately three of the ten sections, i.e. the vibration is below the threshold and quite far from the threshold. In the circular diagram with reference number 403, approximately eight (8) of the ten sections are covered by the shaded area, i.e. the vibration is below but close to the threshold. The circular diagram with reference number 403 provides an indication of that the vibration is below and close to the threshold, i.e. the machine component 105 which the circular diagram 403 represents is run in an unfavorable state. The unfavorable state may be lead to that maintenance personnel will control the dynamic characteristics of the machine component 105 which the circular diagram 403 represents. The circular diagram with reference number 405 more than the ten sections are covered by the shaded area, i.e. the machine component 105 represented by the circular diagram 405 has an error.

When the maintenance personnel or the analyzing device 110 realizes that the vibration is close to the threshold (e.g. circular diagram 403), the indications exemplified in FIG. 4 makes it possible to run the machine 101 and the machine component 105 in a way where the unfavorable resonance state does not lead to a machine component. With the example of the indications in FIG. 4, a complete overview of each machine component 105 with vibration monitoring is provided, and with this it is possible to control the resonance state in the machine 101.

Figure 5:
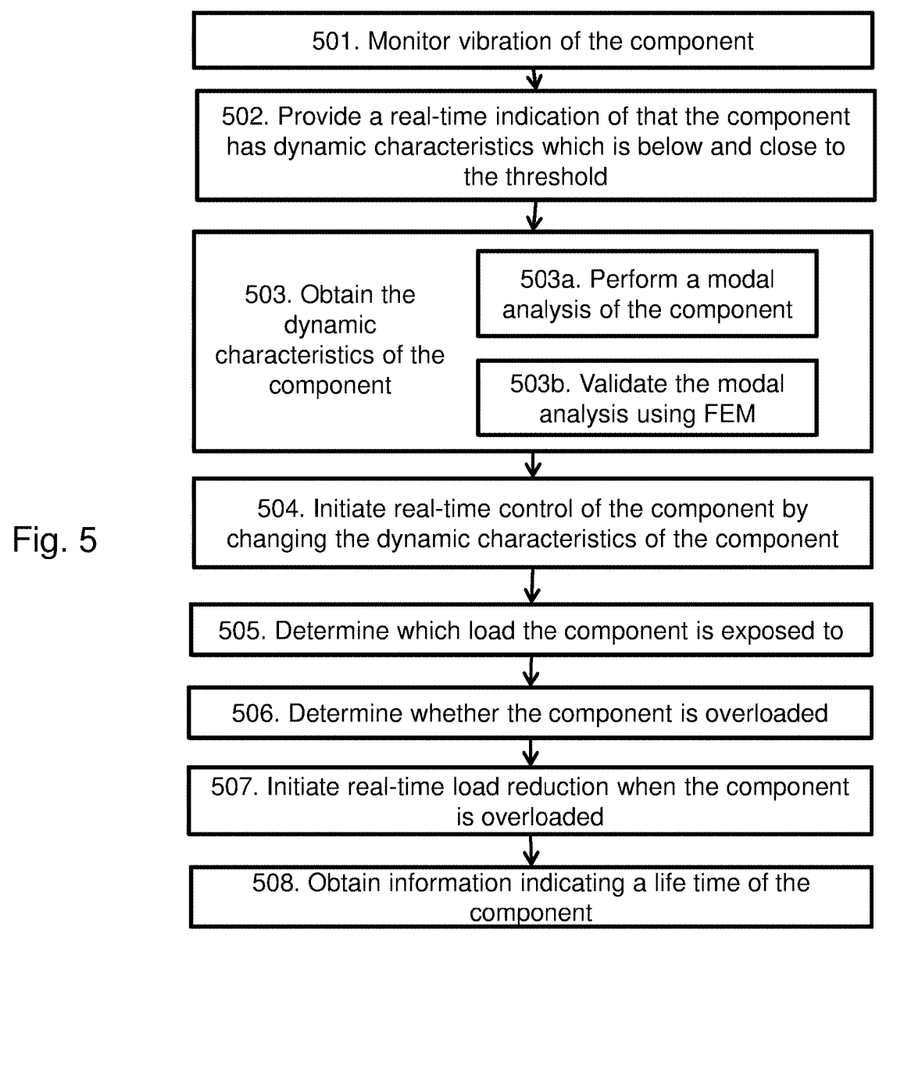
FIG. 5 is a flow chart illustrating embodiments of a method.

The method described above will now be described seen from the perspective of the analyzing device 110. FIG. 5 is a flowchart describing the present method performed by the analyzing device 110. The method for handling dynamic characteristics of a vibrating machine component 105 provides at least some of the following steps to be performed by the analyzing device 110, which steps may be performed in any suitable order than described below:

Step 501

This step corresponds to step 204 in FIG. 2. The analyzing device 110 monitors vibration of the machine component 105 in real-time. The machine component 105 may be vibrating by moving in at least one of a linear and rotating manner.

Step 502

This step corresponds to step 206 in FIG. 2. When the vibration of the machine component 105 is below and close to a threshold, the analyzing device 110 provides a real-time indication of that the vibration of the machine component 105 is below and close to the threshold. The real-time indication may be provided by for example displaying the indication on a display which e.g. maintenance personnel is monitoring, or the indication may be provided to a controlling unit in the system 100 which is adapted to control the dynamic characteristics of the machine component 105 so that the vibration is below and far away from the threshold etc.

The machine component 105 may be run in an unfavorable resonance state when the vibration is below and close to the threshold. A machine component failure may have occurred when the vibration has reached or is above the threshold.

Step 503

This step corresponds to step 207 in FIG. 2. The analyzing device 110 obtains the dynamic characteristics of the machine component 105 based on that the vibration is below and close to the threshold. A change of the dynamic characteristics influences how close the vibration is to the threshold. This may also be described as the dynamic characteristics are obtained based on vibration data.

The dynamic characteristics may be associated to at least one of moisture, speed, temperature, tension of the machine component 105.

Step 503a

This step is a sub-step of step 503. The analyzing device 110 may perform a modal analysis of the machine component 105.

Step 503b

This step is a sub-step of step 503, and a step which may be performed after step 503a. The analyzing device 110 may validate the modal analysis using a FEM.

Step 504

This step corresponds to step 208 in FIG. 2. Based on the real-time indication, the analyzing device 110 may initiate real-time control of the machine component 105 by changing the dynamic characteristics of the machine component 105. The real-time control may be initiated by for example sending a trigger to a controlling unit which is adapted to control the dynamic characteristics of the machine component 105, or it may be initiated by providing a message to the maintenance personnel in order for them to control the machine component 105.

Step 505

Based on the dynamic characteristics, the analyzing device 110 may determine an amount of load which the machine component 105 is exposed to.

Step 506

Based on the determined load, the analyzing device 110 may determine whether the machine component 105 is overloaded.

Step 507

The analyzing device 110 may initiate real-time load reduction when the machine component 105 is overloaded.

Step 508

Based on the dynamic characteristics, the analyzing device may obtain information indicating a life time of the machine component 105.

Figure 6:
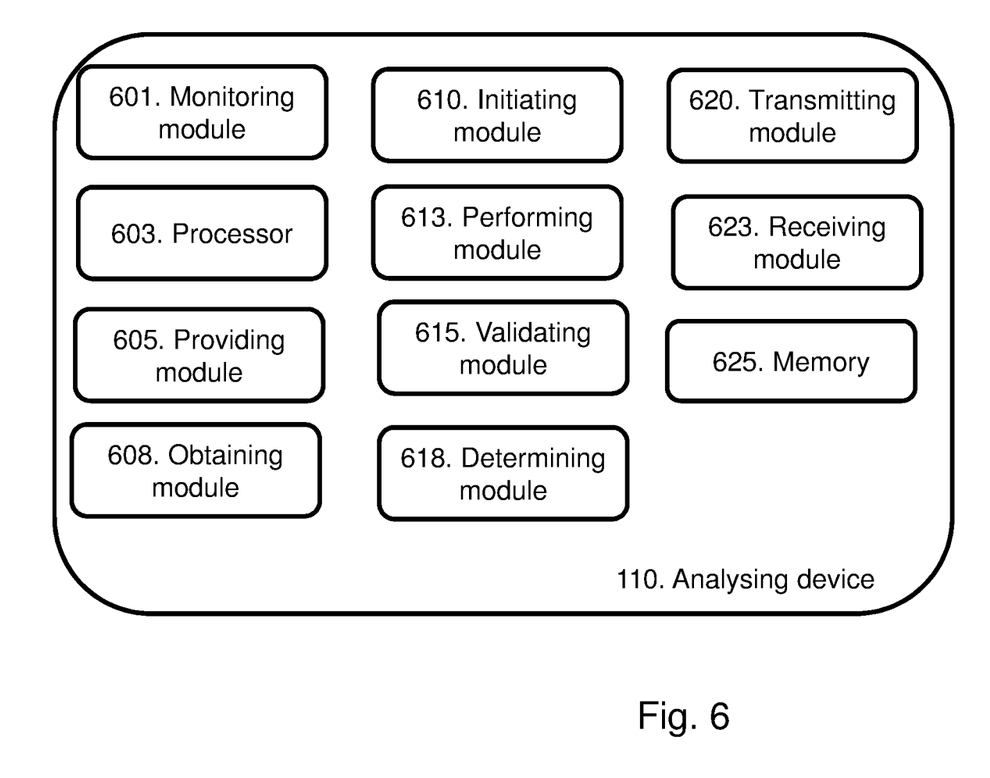
FIG. 6 is a schematic block diagram illustrating an example of the analyzing device.

To perform the method steps shown in FIGS. 2 and 5 for handling dynamic characteristics of the vibrating machine component 105 the analyzing device 110 may provide an arrangement as shown in FIG. 6. To perform the method steps shown in FIGS. 2 and 5 for handling dynamic characteristics of the vibrating machine component 105, the analyzing device 110 is adapted to, e.g. by means of a monitoring module 601, monitor vibration of the machine component 105 in real-time. The monitoring module 601 may also be referred to as a monitoring unit, a monitoring means, a monitoring circuit, means for monitoring etc. The monitoring module 601 may be a processor 603 of the analyzing device 110. The machine component 105 may be adapted to move in at least one of a linear and rotating manner.

The analyzing device 110 is further adapted to, e.g. by means of a providing module 605, when the vibration of the machine component 105 is below and close to a threshold, provide a real-time indication of that the vibration of the machine component 105 is below and close to the threshold. The providing module 605 may also be referred to as a providing unit, a providing means, a providing circuit, means for providing etc. The providing module 605 may be the processor 603 of the analyzing device 110. The machine component 105 may be adapted to be run in an unfavorable resonance state when the vibration is below and close to the threshold. A machine component failure may have occurred when the vibration has reached or is above the threshold.

The analyzing device 110 is adapted to, e.g. by means of an obtaining module 608, obtain the dynamic characteristics of the machine component 105 based on that the vibration is below and close to the threshold. A change of the dynamic characteristics influences how close the vibration is to the threshold. The obtaining module 608 may also be referred to as an obtaining unit, an obtaining means, an obtaining circuit, means for obtaining etc. The obtaining module 608 may be the processor 603 of the analyzing device 110. The dynamic characteristics may be associated to at least one of moisture, speed, temperature, tension of the machine component 105.

The analyzing device 110 may be adapted to, e.g. by means of an initiating module 610, based on the indication, initiate real-time control of the machine component 105 by changing the dynamic characteristics of the machine component 105. The initiating module 610 may also be referred to as an initiating unit, an initiating means, an initiating circuit, means for initiating etc. The initiating module 610 may be the processor 603 of the analyzing device 110.

The analyzing device 110 may be adapted to, e.g. by means of a performing module 613, perform a modal analysis of the machine component 105. The performing module 613 may also be referred to as a performing unit, a performing means, a performing circuit, means for performing etc. The performing module 613 may be the processor 603 of the analyzing device 110.

The analyzing device 110 may be adapted to, e.g. by means of a validating module 615, validate the modal analysis using a FEM. The validating module 615 may also be referred to as a validating unit, a validating means, a validating circuit, means for validating etc. The validating module 615 may be the processor 603 of the analyzing device 110.

The analyzing device 110 may be adapted to, e.g. by means of a determining module 618, based on the dynamic characteristics, determine an amount of load the machine component 105 is exposed to. The determining module 618 may also be referred to as a determining unit, a determining means, a determining circuit, means for determining etc. The determining module 618 may be the processor 603 of the analyzing device 110.

The analyzing device 110 may be adapted to, e.g. by means of the determining module 618, based on the determined load, determine whether the machine component 105 is overloaded.

The analyzing device 110 may be adapted to, e.g. by means of the initiating module 610, initiate real-time load reduction when the machine component 105 is overloaded.

The analyzing device 110 may be adapted to, e.g. by means of the obtaining module 608, based on the dynamic characteristics, obtain information indicating a life time of the machine component 105.

The analyzing device 110 may be adapted to, e.g. by means of a transmitting module 620, transmit information and data to other units in the system 100, e.g. the vibration sensor 108, the machine component 105, a control unit etc. The transmitting module 620 may also be referred to as a transmitting unit, a transmitting means, a transmitting circuit, means for transmitting, output unit etc. The transmitting module 620 may be a transmitter, a transceiver etc. The transmitting module 620 may be a wireless transmitter of the analyzing device 110 of the system 100. The transmitting module 620 may be the obtaining module 608.

The analyzing device 110 may be adapted to, e.g. by means of a receiving module 623, receive information and data from other units in the system 100, e.g. the vibration sensor 108, the machine component 105, a control unit etc. The receiving module 623 may also be referred to as a receiving unit, a receiving means, a receiving circuit, means for receiving, input unit etc. The receiving module 623 may be a receiver, a transceiver etc. The receiving module 623 may be a wireless receiving of the analyzing device 110 of the system 100. The receiving module 623 may be the providing module 605.

The analyzing device 110 may further provide a memory 625 comprising one or more memory units. The memory 625 is arranged to be used to store data, received data streams, power level measurements, vibration data, dynamic characteristics, control data, analyze data, information indicating the load, overload information, information indicating the life time, movement information, threshold values, time periods, configurations, scheduling's, and applications to perform the methods herein when being executed in the analyzing device 110. The memory 625 provides instructions which are executable by the processor 603.

Those skilled in the art will also appreciate that the monitoring module 601, the providing module 605, the obtaining module 608, the initiating module 610, the performing module 613, the validating module 615, the determining module 618, the transmitting module 620 and the receiving module 623 described above may refer to a combination of analog and digital circuits, and/or one or more processors configured with software and/or firmware, e.g. stored in a memory, that when executed by the one or more processors such as the processor 603 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 7:
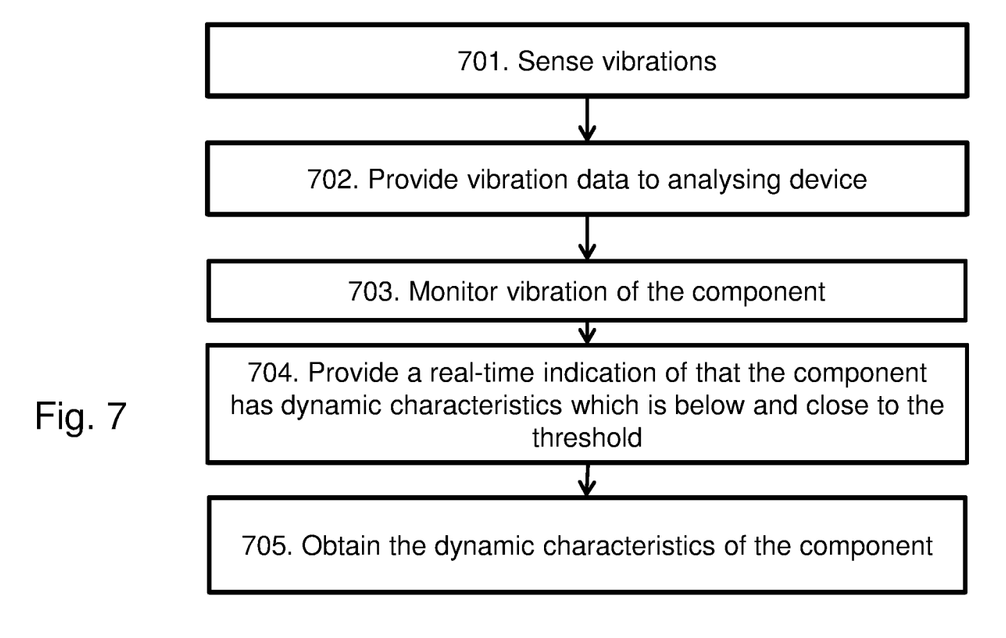
FIG. 7 is a schematic block diagram illustrating embodiments of a method.

The method described above will now be described seen from the perspective of the system 100. FIG. 7 is a flowchart describing the present method performed by the system 100. The method for handling dynamic characteristics of a vibrating machine component 105 provides at least some of the following steps to be performed by the system 100, which steps may be performed in any suitable order than described below:

Step 701

This step corresponds to step 202 in FIG. 2. The vibration sensor 108 senses vibration of the machine component 105 in real-time.

Step 702

This step corresponds to step 203 in FIG. 2. The vibration sensor 108 provides vibration data to an analyzing device 110.

Step 703

This step corresponds to step 204 in FIG. 2 and step 501 in FIG. 5. The analyzing device 110 monitors the vibration of the machine component 105 in real-time based on the vibration data from the vibration sensor 108.

Step 704

This step corresponds to step 206 in FIG. 2 and step 502 in FIG. 2. When the dynamic characteristics of the machine component 105 are below and close to a threshold, the analyzing device 110 provides a real-time indication of that the vibration of the machine component 105 is close to the threshold.

Step 705

This step corresponds to step 207 in FIG. 2 and step 503 in FIG. 5. The analyzing device 110 obtains the dynamic characteristics of the machine component 105 based on that the vibration is below and close to the threshold. A change of the dynamic characteristics influences how close the vibration is to the threshold.

To perform the method steps shown in FIGS. 2, 5 and 7 for handling dynamic characteristics of the vibrating machine component 105, the system 100 may provide an arrangement as shown in FIG. 1. To perform the method steps shown in FIGS. 2, 5 and 7 for handling dynamic characteristics of the vibrating machine component 105, the system 100 is adapted to, e.g. by means of the vibration sensor 108, sense vibration of the machine component 105 in real-time.

The system 100 is adapted to, e.g. by means of the vibration sensor 108, provide vibration data to an analyzing device 110.

The system 100 is adapted to, e.g. by means of the analyzing device 110, monitor the vibration of the machine component 105 in real-time based on the vibration data from the vibration sensor 108.

The system 100 is adapted to, e.g. by means of the analyzing device 110, when the dynamic characteristics of the machine component 105 is below and close to a threshold provide a real-time indication of that the vibration of the machine component 105 is close to the threshold.

The system 100 is adapted to, e.g. by means of the analyzing device 110, obtain the dynamic characteristics of the machine component 105 based on that the vibration is below and close to the threshold, wherein a change of the dynamic characteristics influences how close the vibration is to the threshold.

A computer program may provide instructions which, when executed on at least one processor (e.g. the processor 603 illustrated in FIG. 6), cause the at least one processor to carry out at least some of the method steps 201-208 in FIG. 2, 501-508 in FIG. 5 and steps 701-705 in FIG. 7. A carrier may provide the computer program, and the carrier may be one of an electronic signal, optical signal, radio signal or computer readable storage medium.

With the embodiments herein, the real-time vibration data and the dynamic characteristics of the machine component 105 enables improvements of operation parameters and process parameters associated with the machine 101 and the machine component 105. Such parameters may be for example the number of revolutions, wire or band tension, weight, percentage of water etc. This is performed to avoid that the machine 101 and the machine component 105 is run in an unfavorable resonance state for a too long time, which may lead to quality problems on both the machine 101, the machine component 105 and the end product which the machine 101 produces.

Summarized, the embodiments herein provide a system for monitoring of vibration data in real time, and for real-time correction of dynamic characteristics (e.g. process parameters) in order to avoid that machine components in a machine are in an unfavorable state too long. The correction may take place when the machine component 105 enters an unfavorable state. The dynamic characteristics of the machine component 105 are analyzed in order to correct the process to that the machine component 105 is not overloaded. Examples of machines 101 which the embodiments herein are applicable to is a paper making machine, mil, conveyor etc. Examples of dynamic characteristics are moisture content, speed, temperature, tension etc. Deviations from the normal dynamic behavior of the machine component 105 can be used for identifying the start of a malfunction in the machine component 105.

The embodiments herein are not limited to the above described embodiments. Various alternatives, modifications and equivalents may be used. Therefore, the above embodiments should not be taken as limiting the scope of the embodiments, which is defined by the appending claims.

It should be emphasized that the term "provides/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The term "configured to" used herein may also be referred to as "arranged to", "adapted to", "capable of" or "operative to".

It should also be emphasized that the steps of the methods defined in the appended claims may, without departing from the embodiments herein, be performed in another order than the order in which they appear in the claims.

The invention claimed is:

1. A method for handling-dynamic characteristics of a vibrating machine component, the method performed by an analyzing device comprising a memory and a processor, the memory providing instructions executable by the processor that cause the analyzing device to perform the method, the method comprising:
    monitoring, by the analyzing device, a vibration of the vibrating machine component in real-time,
    wherein the analyzing device is adapted to communicate with a vibration sensor in real-time to receive the vibration;
    providing, by the analyzing device, a real-time indication of the vibration of the vibrating machine component when the vibration of the vibrating machine component is below and close to a threshold, and
    translating, by the analyzing device, the vibration of the vibrating machine component into the dynamic characteristics of the vibrating machine component in response to the real-time indication being provided by performing a modal analysis of the vibrating machine component,
    wherein the modal analysis comprises expressing the vibration of the vibrating machine component by a corresponding natural frequencies and a mode of vibration,
    wherein a change of the dynamic characteristics influences how close the vibration is to the threshold,
    determining a first amount of load to which the vibrating machine component is exposed and also a total amount of load of the vibrating machine component in order to detect, indicate and initiate reduction of the overload, based on the real-time indication, initiating real-time control of the vibrating machine component by changing the dynamic characteristics of the vibrating machine component by initiating real time load reduction when the vibrating machine component is overloaded, and
    wherein the analyzing device continues to monitor the dynamic characteristics of the vibrating machine component at and above the threshold such that the start of failure of the machine component is detected.

2. The method according to claim 1, wherein the translating the vibrating machine component into the step of obtaining the dynamic characteristics of the vibrating machine component further comprises: performing a modal analysis of the vibrating machine component; and validating the modal analysis using a Finite Element Method, FEM.

3. The method according to claim 1, further comprising:
    determining an amount of load which the vibrating machine component is exposed to based on the dynamic characteristics; and
    determining whether the vibrating machine component is overloaded based on the determined load.

4. The method according to claim 3, further comprising: initiating real-time load reduction when the vibrating machine component is overloaded.

5. The method according to claim 1, further comprising:
    obtaining information indicating a life time of the vibrating machine component based on the dynamic characteristics.

6. The method according to claim 1, wherein the dynamic characteristics are associated to at least one of moisture, speed, temperature, tension of the vibrating machine component.

7. The method according to claim 1, wherein the vibrating machine component
    is run in an unfavorable resonance state when the vibration is below and close to the threshold.

8. The method according to claim 1, wherein a vibrating machine component failure has occurred when the vibration has reached or is above the threshold.

9. The method according to claim 1, wherein the vibrating machine component is moving in at least one of a linear and rotating manner.

10. A method for handling-dynamic characteristics of a vibrating machine component, the method performed by an analyzing device comprising a memory and a processor, the memory providing instructions executable by the processor that cause the analyzing device to perform the method, the method comprising:
    monitoring, by the analyzing device, a vibration of the vibrating machine component in real-time,
    wherein the analyzing device is adapted to communicate with a vibration sensor in real time to receive the vibration;
    providing, by the analyzing device, a real-time indication of the vibration of the vibrating machine component when the vibration of the vibrating machine component is below and close to a threshold, and
    translating, by the analyzing device, the vibration of the vibrating machine component into the dynamic characteristics of the vibrating machine component in response to the real-time indication being provided by performing a modal analysis of the vibrating machine component,
    wherein the modal analysis comprises expressing the vibration of the vibrating machine component by a corresponding natural frequencies and a mode of vibration,
    wherein a change of the dynamic characteristics influences how close the vibration is to the threshold,
    determining a first amount of load to which the vibrating machine component is exposed and also a total amount of load of the vibrating machine component in order to detect, indicate and initiate reduction of the overload, based on the real-time indication, initiating real-time control of the vibrating machine component by changing the dynamic characteristics of the vibrating machine component by initiating real time load reduction when the vibrating machine component is approaching overload, and wherein the analyzing device continues to monitor the dynamic characteristics of the vibrating machine component at and above the threshold such that the start of failure of the machine component is detected.

11. The method according to claim 10, wherein the translating the vibrating machine component into the step of obtaining the dynamic characteristics of the vibrating machine component further comprises: performing a modal analysis of the vibrating machine component; and validating the modal analysis using a Finite Element Method, FEM.

12. The method according to claim 10, further comprising:

determining an amount of load which the vibrating machine component is exposed to based on the dynamic characteristics; and determining whether the vibrating machine component is overloaded based on the determined load.

13. The method according to claim 10, wherein the dynamic characteristics are associated to at least one of moisture, speed, temperature, tension of the vibrating machine component.

* * * * *